United States Patent
Pawar et al.

(10) Patent No.: US 8,526,468 B1
(45) Date of Patent: Sep. 3, 2013

(54) METHOD AND SYSTEM FOR QUALITY-OF-SERVICE-DIFFERENTIATED REVERSE ACTIVITY BIT

(75) Inventors: Hemanth Balaji Pawar, Herndon, VA (US); Shilpa Kowdley Srinivas, Herndon, VA (US); Bhagwan Khanka, Lenexa, KS (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 625 days.

(21) Appl. No.: 12/404,846

(22) Filed: Mar. 16, 2009

(51) Int. Cl.
*H04J 3/18* (2006.01)
*G01R 31/08* (2006.01)

(52) U.S. Cl.
USPC .......................................... 370/477; 370/252

(58) Field of Classification Search
USPC .................. 370/230–232, 235, 236, 252, 477
See application file for complete search history.

(56) References Cited

U.S. PATENT DOCUMENTS

| | | | |
|---|---|---|---|
| 6,970,437 B2 | 11/2005 | Lott et al. | |
| 7,058,124 B2 | 6/2006 | Koo | |
| 7,069,037 B2 | 6/2006 | Lott et al. | |
| 7,647,065 B2 | 1/2010 | Au et al. | |
| 7,831,257 B2 | 11/2010 | Pollman | |
| 7,963,698 B2 | 6/2011 | Grazziotin | |
| 7,991,422 B2 | 8/2011 | Oroskar et al. | |
| 2003/0218997 A1 | 11/2003 | Lohtia et al. | |
| 2004/0121808 A1 | 6/2004 | Hen et al. | |
| 2004/0179494 A1* | 9/2004 | Attar et al. | 370/332 |
| 2004/0179525 A1* | 9/2004 | Balasubramanian et al. | 370/391 |
| 2004/0214591 A1* | 10/2004 | Lott et al. | 455/522 |
| 2005/0047365 A1* | 3/2005 | Hong et al. | 370/328 |
| 2006/0203724 A1* | 9/2006 | Ghosh et al. | 370/229 |
| 2006/0223444 A1 | 10/2006 | Gross et al. | |
| 2006/0291383 A1* | 12/2006 | Bi et al. | 370/229 |
| 2007/0168482 A1* | 7/2007 | Chen et al. | 709/223 |
| 2007/0192090 A1* | 8/2007 | Shahidi | 704/221 |
| 2007/0286128 A1 | 12/2007 | Bae et al. | |
| 2008/0004031 A1* | 1/2008 | Rong et al. | 455/452.1 |
| 2008/0049706 A1 | 2/2008 | Khandekar et al. | |
| 2008/0062925 A1 | 3/2008 | Mate et al. | |
| 2008/0137614 A1* | 6/2008 | Kwon et al. | 370/331 |
| 2008/0212460 A1 | 9/2008 | Sampath | |

(Continued)

OTHER PUBLICATIONS

Unpublished U.S. Appl. No. 12/356,590, entitled "Method and System for Providing Multiple Reverse Activity Bits" filed Jan. 21, 2009 in the name of Hemanth Balaji Pawar.

(Continued)

*Primary Examiner* — Michael Thier
*Assistant Examiner* — Redentor Pasia

(57) ABSTRACT

The disclosure generally relates to service-tier-based regulation of reverse-link activity at an access terminal operating in a wireless access network. An exemplary method involves (a) receiving one or more reverse activity bits from a wireless access network; (b) based 5 at least in part on the received reverse activity bits, determining a Quick Reverse Activity Bit (QRAB) and/or a Filtered Reverse Activity Bit (FRAB); (c) applying a first service-tier filter to the determined QRAB, wherein the first service-tier filter corresponds to a service tier for which the access terminal is authorized; and (d) based at least in part on the service-tier filtered QRAB, determining an adjustment to reverse-link activity of the access terminal. The method may further involve applying a second service-tier filter to the determined FRAB and using the service-tier filtered QRAB in determining the adjustment to reverse-link activity.

18 Claims, 5 Drawing Sheets

(56) References Cited

U.S. PATENT DOCUMENTS

| | | |
|---|---|---|
| 2009/0054072 A1 | 2/2009 | Chen |
| 2009/0103507 A1* | 4/2009 | Gu et al. .................. 370/342 |
| 2009/0170547 A1 | 7/2009 | Raghothaman et al. |
| 2009/0190475 A1* | 7/2009 | Chen et al. ................. 370/236 |
| 2010/0002673 A1 | 1/2010 | Bae et al. |
| 2010/0014487 A1 | 1/2010 | Attar et al. |
| 2010/0103877 A1 | 4/2010 | Wang et al. |
| 2010/0135213 A1 | 6/2010 | Au |
| 2010/0167777 A1 | 7/2010 | Raghothaman et al. |
| 2010/0279653 A1 | 11/2010 | Poltorak |

OTHER PUBLICATIONS

Unpublished U.S. Appl. No. 12/578,347, entitled "Methods and Systems for EV-DO Femtocells to Use Proximity to Prioritize Service to Access Terminals" filed Oct. 13, 2009 in the name of Shilpa Kowdley Srinivas.

Unpublished U.S. Appl. No. 12/620,364, entitled "Using Mobile-Station Revision Ratio to Improve Reverse-Link Performance" filed Nov. 17, 2009 in the name of Jasinder P. Singh.

Unpublished U.S. Appl. No. 12/620,344, entitled "Improving Reverse-Link Performance by Using Differentiated Reverse Activity Bits (RABs) Based on Mobile-Station Revision" filed Nov. 17, 2009 in the name of Jasinder P. Singh.

Non-Final Office Action mailed Aug. 3, 2011 for U.S. Appl. No. 12/356,590.

Non-Final Office Action mailed Mar. 2, 2012 for U.S. Appl. No. 12/356,590.

Notice of Allowance mailed Feb. 14, 2012 for U.S. Appl. No. 12/620,344.

Notice of Allowance mailed Jan. 14, 2012 for U.S. Appl. No. 12/578,347.

* cited by examiner

METHOD AND SYSTEM FOR QUALITY-OF-SERVICE-DIFFERENTIATED REVERSE ACTIVITY BIT

RELATED APPLICATION

This application is related to co-owned U.S. application Ser. No. 12/356,590, which was filed on Jan. 21, 2009.

BACKGROUND

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95, IS-2000, or IS-856. Wireless networks that operate according to these specifications are often referred to as access networks. These access networks typically provide communication services such as voice, Short Message Service (SMS) messaging, and packet-data connectivity.

A mobile station operating in an access network is typically referred to as a wireless access terminal (or simply an "access terminal"), while the network entity with which the wireless access terminal communicates over the air interface is known as a wireless access node (or simply an "access node"). The wireless access node typically includes a device known as a radio network controller (RNC) or base station controller (BSC). The wireless access node may also include one or more base stations (also known as base transceiver stations (BTSs)), each of which includes one or more antennas that radiate to define respective wireless coverage areas within the larger coverage area served by the access network. Among other functions, the RNC controls one or more base stations, and acts as a conduit between the base stations and an entity known as a packet data serving node (PDSN), which provides access to a packet-data network. Thus, when positioned in one of these wireless coverage areas, a wireless access terminal may communicate over the packet-data network via the wireless access node and the PDSN.

Many service providers currently use wireless networks that provide service under a protocol known as EV-DO, which stands for "Evolution Data Optimized." EV-DO networks, operating in conformance with industry specification EV-DO, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network).

When congestion occurs on the reverse-link, an access node may employ a reverse-activity bit (RAB) to control or adjust the load on the reverse-link. More specifically, in each timeslot, an EV-DO access node typically transmits an RAB to all the access terminals operating in the sector it serves. The RAB indicates either that the access terminal may continue its communications on the reverse-link with no change, or that the access terminal should adjust its reverse-link activity.

OVERVIEW

For various reasons, a service provider may desire that reverse-link traffic be regulated differently for different users. For example, some users may wish to pay for a higher service tier with increased bandwidth and/or access to premium applications. Some may desire a service tier with guaranteed service. Others may not mind having reduced capabilities in times of high congestion (e.g., having a lower priority), so long as higher-quality service is provided when available. Many other user preferences and needs also exist. Furthermore, differentiated regulation of reverse-link traffic may be desirable for many other reasons, such as the preferences or needs of a service provider, among others. Accordingly, an exemplary embodiment provides for quality-of-service (QoS) differentiated (e.g., service-tier differentiated) regulation of reverse-link activity by an access terminal.

In one aspect, a method carried out at an access terminal is disclosed. The method involves (a) receiving one or more reverse activity bits from a wireless access network; (b) based at least in part on the received reverse activity bits, determining a Quick Reverse Activity Bit (QRAB); (c) applying a first service-tier filter to the determined QRAB, wherein the first service-tier filter corresponds to a service tier for which the access terminal is authorized; and (d) based at least in part on the service-tier filtered QRAB, determining an adjustment to reverse-link activity of the access terminal. The method may further involve determining a Filtered Reverse Activity Bit (FRAB) and applying a second service-tier filter to the determined FRAB, wherein the second service-tier filter also corresponds to the service tier for which the access terminal is authorized. Further, the method may involve periodically determining the QRAB and FRAB, and filtering the determined QRAB and/or the determined FRAB.

In another aspect, a method carried out at an access terminal is disclosed. The method involves (a) receiving one or more reverse activity bits from a wireless access network; (b) based at least in part on the received reverse activity bits, determining a Filtered Reverse Activity Bit (FRAB); (c) applying a first quality-of-service (QoS) filter to the determined FRAB, wherein the first QoS filter corresponds to a QoS tier for which the access terminal is authorized; and (d) based at least in part on the QoS-filtered FRAB, determining an adjustment to reverse-link activity of the access terminal. The method may further involve determining the QRAB and applying a second QoS filter to the determined QRAB, wherein the second QoS filter corresponds to the QoS tier for which the access terminal is authorized.

In another aspect, an access terminal is disclosed. The access terminal comprises: (a) a communication interface; (b) a processor; and (c) data storage comprising instructions executable by the processor to: (i) receive one or more reverse activity bits from a wireless access network; (ii) based at least in part on the received reverse activity bits, determine a Quick Reverse Activity Bit (QRAB) and a Filtered Reverse Activity Bit (FRAB); (iii) apply a service-tier filter to at least one of (a) the determined QRAB and (b) the determined FRAB, wherein the service-tier filter corresponds to a service tier for which the access terminal is authorized; and (iv) based at least in part on output of the service-tier filter, determine an adjustment to reverse-link activity of the access terminal. The access terminal may be configured to apply a service-tier filter or filters to the determined QRAB only, to the determined FRAB only, or to both the determined QRAB and the determined FRAB. Further, the access terminal may be configured to request authorization from the wireless access network to receive wireless service at a particular service tier.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Figure 1:
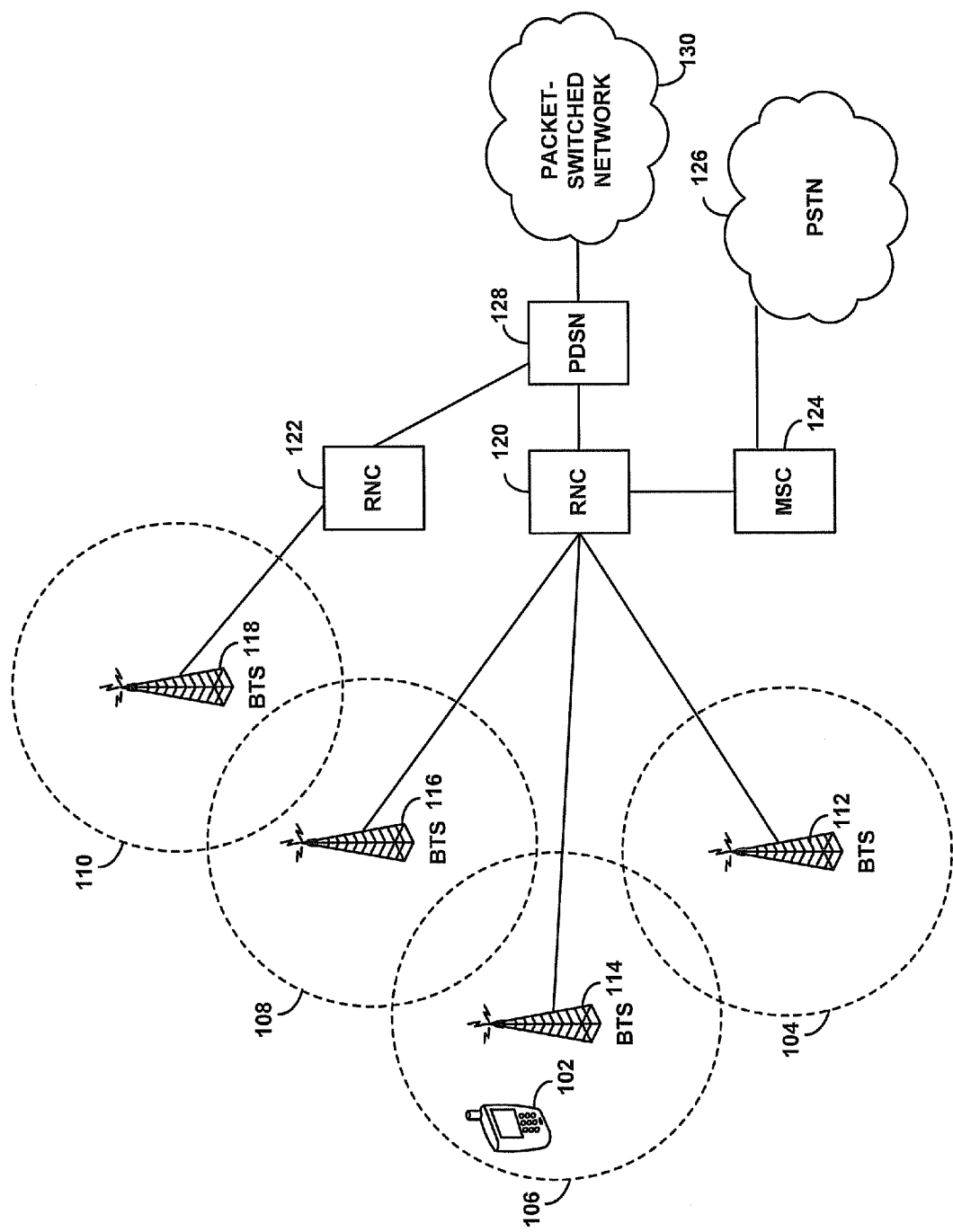
FIG. 1 is a block diagram of an access network configured to provide wireless service to wireless access terminals, according to an exemplary embodiment.

FIG. 1 is a block diagram of an access network configured to provide wireless service to wireless access terminals. As shown, an access network may include a plurality of base stations 112-118. Each base station 112-118 of the access network may function to transmit RF-radiation patterns at one or more carrier frequencies. The RF-radiation patterns may then provide one or more air interfaces over which the access terminal 102 may communicate with the access network. For example, each base station 112-118 may transmit omni-directional RF-radiation patterns that provide a single air interface. Alternatively, each base station 112-118 may transmit directional RF-radiation patterns that provide multiple air interfaces.

Each base station 112-118 may serve a corresponding wireless coverage area 104-110, respectively. If a base station, such as base station 112, provides a single air interface, then the base station may serve a single wireless coverage area 104 (e.g., a cell). Alternatively, if a base station provides multiple air interfaces, the base station may serve multiple wireless coverage areas (e.g., sectors). (Note that if a base station serves a single coverage area, the coverage area is generally referred to as a cell but may also be referred to as a sector.) In either case, each of the one or more air interfaces and their corresponding wireless coverage areas may be defined by the one or more carrier frequencies of their respective serving base station 112-118 and/or a pseudo-random number (PN) offset that distinguishes one wireless coverage area of the a given base station from another.

Each base station tower is typically connected with a radio network controller (RNC) (also known as a base station controller (BSC)). In the access network, base stations 112-116 are connected to RNC 120, and base station 118 is connected to RNC 122. Each RNC may function to communicate with and control aspects of the base stations it serves, as well as aspects of air-interface communications with the access terminal 102. Each RNC, such as RNC 120 or RNC 122, may then be coupled to a switch or gateway, such as a mobile switching center (MSC) 124, which may provide connectivity with public-switched telephone network (PSTN) 126. Further, RNC 120 may also be coupled to a switch or gateway, such as a packet-data serving node (PDSN) 128, which may provide connectivity with a packet-switched network 130, such as the Internet. In this respect, RNC 120 may additionally include a packet control function ("PCF") for controlling packet-data communications. With this general arrangement, the access network may facilitate communications between access terminals operating in the access network's coverage areas and PSTN 128 and/or the packet-switched network 126.

The network may communicate with access terminal 102 according to any of a variety of air-interface protocols. For example, the air-interface communications may be carried out according to CDMA (e.g., 1xRTT, EV-DO), iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and other protocols now known or later developed. Depending on the protocol employed, the air interfaces may also be divided into a plurality of channels for carrying different types of communications between the access terminal 102 and the access network. For example, under EV-DO, each air interface may include forward-link channels (e.g., control channels, forward-traffic channels, etc.) for carrying forward-link communications from the access network to the access terminal 102, as well as reverse-link channels (e.g., access channels, reverse-traffic channels, etc.) for carrying reverse-link communications from the access terminal 102 to the access network.

To provide the arrangement of FIG. 1 in practice, each access terminal is commonly equipped with a "mobile station modem" chipset such as one of the various "MSM" chipsets available from Qualcomm Incorporated, and each base station is commonly equipped with a "cell site modem" chipset such as one of the various "CSM" chipsets available from Qualcomm Incorporated. Preferably, the air-interface protocols under which service is provided by the access network include EV-DO. By way of example, each cell site modem can be a Qualcomm CSM6800™ chipset, and each mobile station modem can be an MSM6800™ chipset, or the latest chipsets improving thereupon. Both the CSM6800™ chipset and MSM6800™ chipset have EV-DO operating modes (e.g., 1xEV-DO Rev. 0 or Rev. A), and each chipset can be programmatically set to operate in that mode. It should be understood that other chipsets, including successors to the chipsets named herein, as well as others providing similar functionality, may also be utilized without departing from the scope of the invention.

Under EV-DO, the forward link uses time-division multiplexing (TDM) in order to allocate all of the sector's forward-link power to a given access terminal at any given moment, while the reverse link retains the code-division multiplexing (CDM) format of 1xRTT, albeit with the addition of a "data rate control" (DRC) channel used to indicate the supportable data rate and best serving sector for the forward link. The EV-DO forward link is divided into time slots of length 2048 chips, and each time slot is further time-division multiplexed to carry various channels, including a pilot channel, a Medium Access Control (MAC) channel, a "control" channel, and, if any traffic exists, a forward traffic channel.

The MAC channel is typically used to provide information for those access terminals that are active in a sector (i.e., that have established connectivity to the base station serving the sector). In particular, the MAC channel provides data rate control (DRC) mechanisms to control the data rate that an access terminal should use on the forward link. (The forward-link data rate is generally determined based on the SNR for the access terminal.) The MAC channel includes a number of sub-channels, which are each identified by a unique MAC index. In practice, the MAC channel may include 128 sub-channels, identified by MAC indices of 0 to 127, respectively. Each MAC subchannel is spread by a Walsh code, which, in EV-DO, is either a 64-bit or 128-bit Walsh code.

On the reverse link, interference can be, and often is, present within a sector. In general, an access node receives transmissions from access terminals that are operating in the sector it serves. However, the access node often also receives interfering transmissions from other access terminals, other devices, and/or any other source using the same frequency or frequencies as a given sector. At times, when interference is high, the access network may desire that access terminals operating in a given sector, reduce their reverse-link activity. Accordingly, an access network may transmit a reverse-activity bit (RAB) that instructs access terminals to adjust their reverse-link activity. The value of the RAB is generally based upon a parameter referred to as reverse noise rise (RNR).

More specifically, at a given moment, the sum total of what an access node is receiving in a given sector is known as the "reverse noise" in that sector. At regular intervals, and in current practice quite frequently (e.g., once for every forward-link timeslot—approximately every 1.67 ms), access nodes compute the RNR, which is the difference between (i) the reverse noise that the access node is currently detecting and (ii) a baseline level of reverse noise. Thus, the access node computes how far the reverse noise has risen above that baseline.

To determine the baseline level, EV-DO networks typically utilize what is known as a silent interval, which occurs periodically (e.g., once every five minutes), and lasts on the order of 40-100 ms. Both the period and the duration of the silent interval are typically configurable. During the silent interval, access terminals refrain from transmitting anything to the access node. As a result, whatever is received during the sleep interval may be characterized as noise. As such, the baseline corresponds to the amount of reverse noise when the sector is unloaded (i.e. without any transmitting access terminals). Note that other reverse-link-noise levels could be used as a baseline, other than the unloaded-sector level.

In general, the lower the RNR is at a given moment, the more favorable the RF conditions are for communication between access terminals and the access node at that moment. Correspondingly, the higher the RNR, the less favorable the RF conditions are. Also, a low RNR generally corresponds to a sector being lightly loaded (i.e., the sector is supporting communications for a relatively low number of access terminals). A high RNR, as one might expect, generally corresponds to a sector being heavily loaded (i.e., the sector is supporting communications for a relatively high number of access terminals).

Access nodes typically use the calculated value of RNR to, among other things, set the RAB, which is a value that the access node makes equal to 0 or 1. Note that making the RAB equal to 0 (zero) is known as "clearing" the RAB, while making the RAB equal to 1 (one) is known as "setting" the RAB. Under EV-DO, Rev. A, the access node repeatedly transmits (e.g., once in every forward-link timeslot) an RAB equal to either 0 or 1. Accordingly, the access node typically repeats the calculation of RNR once in every forward-link timeslot (e.g., once every 1.67 ms.

With respect to how the access node chooses whether to set or clear the RAB, if the RNR is above a threshold (the "RNR threshold") the access node sets the RAB. If the RNR is below the RNR threshold, the access node clears the RAB. The RNR threshold may be configurable, for example, between 0 decibels (dB) and 30 dB, and is typically set to be 5 dB in EV-DO networks. According to EV-DO, Rev. A, the access node transmits the RAB on the MAC subchannel identified by MAC Index 4. Note also that according to EV-DO, Rev. A, the RAB is the same for all access terminals on a sector/carrier.

Each individual access terminal may receive the RAB for its serving sector, as well as the RAB from each sector in its active set. The RAB from the serving sector and those from its active-set sectors may then be used by the access terminal to compute what are known as a Quick Reverse Activity Bit (QRAB) and a Filtered Reverse Activity Bit (FRAB). The QRAB is binary (equal to 0 or 1), while the FRAB is a real number having a value anywhere between $-1$ and $+1$ inclusive.

The QRAB is a short-term, binary indication of loading. A QRAB of 1 is associated with congestion on the sector/carrier, while a QRAB of 0 is associated with non-congestion. According to EV-DO, Rev. A, the QRAB is calculated periodically, after every four timeslots, by determining, for each sector, the average value of the sector's RAB over the previous four time slots. The maximum of these average RAB values is then rounded to nearest whole number (i.e., 0 or 1). Take, for example, an access terminal that is served by sector_A and has an active set including sector_B. The RAB values for sector_A in four consecutive timeslots are 0, 0, 0, and 1, respectively, and the RAB values for sector_B in the same four timeslots are 1, 1, 0, and 1, respectively. Thus, the average RAB value for sector_A is 0.25, and the average for sector_B is 0.75. The maximum of these average RAB values is 0.75 and therefore the QRAB is determined to be 1 (e.g., rounded up from 0.75). It should be understood that in the event that the maximum average RAB is 0.5, it is an engineering design choice as to whether an access terminal will round up or round down.

The FRAB is a longer-term, continuous, historical value, where values closer to $-1$ indicate a lower degree of congestion on the reverse link, and values closer to $+1$ indicate a higher degree of congestion. According to EV-DO, Rev. A, the FRAB is calculated in a similar manner as QRAB (i.e., calculating the average RAB value for each sector, and then determining maximum of those average RABs), except that the RAB value for each sector is averaged over 384 timeslots and the FRAB is a mapping of the maximum average to a value between $-1$ and $+1$ (i.e., not rounded to the nearest whole number). Since the FRAB is also calculated periodically, every four timeslots, only four of the 384 RAB values differ between consecutive FRAB calculations. As a result, the FRAB typically changes much more slowly than the QRAB.

The access terminal uses the QRAB and FRAB to calculate a value known in Rev. A as "T2PInflow." T2PInflow is an iterative value: prior to each reverse-link transmission, it has a current value, and that current value is one of the inputs into determining its value in the next calculation. Note that the "T2P" prefix means "Traffic to Pilot," as one governing principle that drives the determination of reverse-link data rates under Rev. A is the relative values of (1) the power level that the access terminal is using to transmit on the reverse-link portion of the traffic channel and (2) the power level at which the access terminal is detecting the pilot signal from the access node, as is known in the art.

Rev. A defines two functions called "T2PDn(.)" and "T2PUp(.)," both of which are functions of the current T2PInflow, FRAB, and a filtered value of the serving sector pilot strength. If the access terminal sets QRAB to 1 (corresponding to a relatively congested sector/carrier), then T2PInflow will be decremented by the result of T2PDn(.); if, on the other hand, the access terminal sets QRAB to 0 (corresponding to a relatively non-congested sector/carrier), then T2PInflow will be incremented by the result of T2PUp(.). As with all of the details of these computations, the detailed equations can be found in EV-DO, Rev. A.

Under Rev. A, this updated T2PInflow value is then used as one of the inputs in what is referred to as a "token bucket" mechanism, which is used to determine a packet size for the next reverse-link transmission. And it is this packet size that essentially determines the reverse-link data rate at which the access terminal will be transmitting, based on a table that correlates packet sizes to data rates. In general, the token bucket mechanism is used as a regulator, to provide data-rate stability over time, while still permitting some instantaneous deviation.

One of the parameters of the token bucket mechanism is the "BucketLevel." Using that value, the updated T2PInflow, and the FRAB, the access terminal calculates a value known as "PotentialT2POutflow." The access terminal also maintains a data queue for outgoing data (i.e. data that is ready and waiting to be transmitted to the access node on the reverse link). The access terminal keeps track of the current size of this data queue in a variable referred to here as the "data queue size." The access terminal determines the packet size for the next transmission based on PotentialT2POutflow, the data queue size, other constraints and maximum/minimum allowed values, and the access terminal's transmission power.

As stated, the computed packet size essentially determines the reverse-link data rate. Under EV-DO, Rev. A, effective reverse-link data rates can range from 19.2 kbps up to 1.84 megabits per second (Mbps). As a final part of the calculation, the access terminal computes a value known as "T2POutflow" (also referred to as "actual T2POutflow") based on the computed packet size. The access terminal then updates the BucketLevel with the updated T2PInflow value and the newly-calculated (actual) T2POutflow value, so that the BucketLevel will be ready for the next iteration.

Naturally, there will be times when transmission conditions are favorable with respect to the wireless service (i.e., times when favorable RF conditions prevail), and there will be times when poor RF conditions are present. As described above, current implementations of EV-DO networks deal with this, in among other ways, by setting the RAB when RF conditions are unfavorable (associated with a relatively high RNR), and by clearing the RAB when RF conditions are favorable (associated with a relatively low RNR).

When the RAB is set, access terminals typically maintain or decrease their reverse-link data-transmission rates, and consequently their reverse-link transmission power levels—actions that may help correct a high-RNR situation. When the RAB is clear, access terminals are typically configured to maintain or increase their reverse-link data rates and power levels, which may cause RNR to increase, though this is considered acceptable when RNR is initially low enough—and of course it is desirable to grant higher reverse-link data rates to access terminals when tolerable.

Figure 2A:
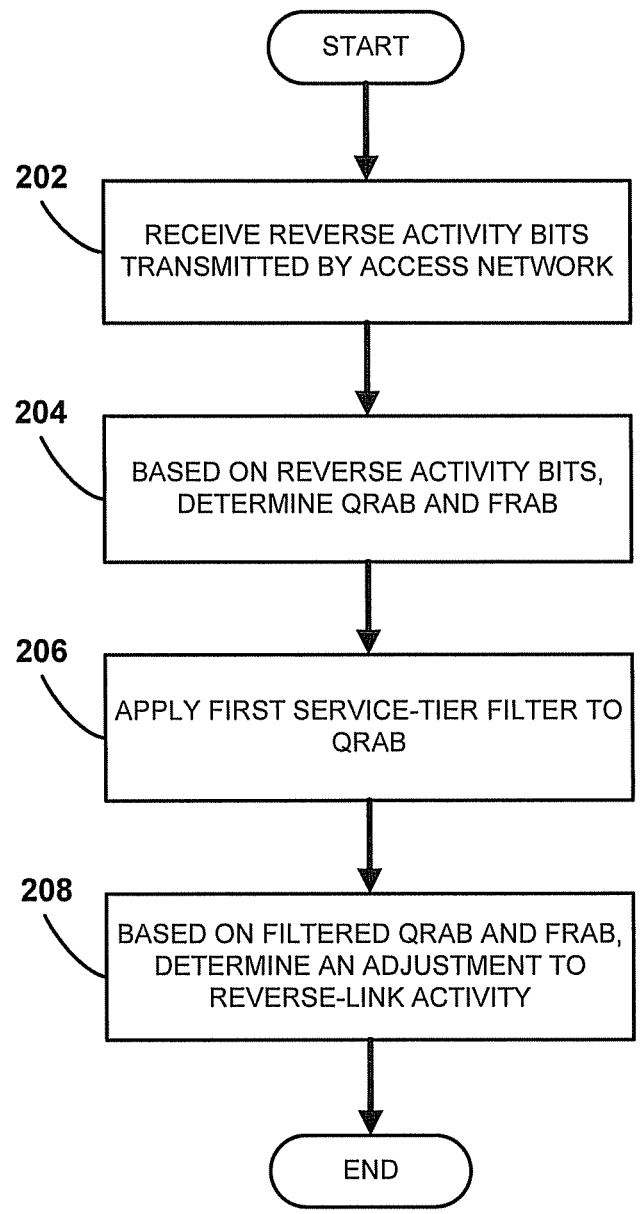
FIG. 2A is a flow chart illustrating a method that is carried out by an access terminal, according to an exemplary embodiment.

FIG. 2A is a flow chart illustrating a method that is carried out by an access terminal, according to an exemplary embodiment. The method may be used by an access terminal to connect to and receive service from an access network providing multiple service tiers, and in particular, to adjust its reverse-link activity according to the service tier for which the access terminal is authorized. The method involves receiving one or more reverse activity bits from a wireless access network, as shown by block 202. The access terminal may then, based on the received reverse activity bits, determine the QRAB and the FRAB, as shown by block 204. The access terminal then applies a first service-tier filter, which corresponds to a service tier for which the access terminal is authorized, to the QRAB, as shown by block 206. Based on the filtered QRAB and the FRAB, the access terminal then determines an adjustment to its reverse-link activity, as shown by block 208.

In a further aspect, the method may involve requesting and receiving (or possibly just receiving) authorization for a particular service tier. For example, the access terminal may connect in an access network where the service provider provides multiple service tiers to which a user may subscribe. When, for instance, the access terminal is connecting or requesting a particular service, the access terminal may prompt the user for authorization information, such as a user name and password, and send the authorization information entered by the user to the access network. Then, once the access network has authorized the user, the access terminal may receive authorization from the access network for a particular service tier. Further, the access terminal may be configured to receive certain data or information from the access network that allows it to access particular services and/or certain network resources designated for its authorized service tier. Generally, an access terminal and/or access network may employ any appropriate technique for authorizing a user or an access terminal for certain services and/or resources, without departing from the scope of the invention.

An access terminal may receive an RAB from its serving sector as well as from the sectors in its active set. In an exemplary embodiment, each RAB may be received over the MAC channel from its respective sector. More specifically, in a given sector, the RAB may be received via the MAC subchannel identified by MAC Index 4, which in EV-DO, Rev. A is designated as a reverse-activity channel. Alternatively, and in accordance with co-owned U.S. patent application Ser. No. 12/356,590, multiple RABs may be provided in a given sector, and the access terminal may receive and use only the RAB that is designated for its authorized service tier. Other techniques for receiving the RAB are also possible.

As explained, the first service-tier filter corresponds to the service tier for which the access terminal is authorized. Accordingly, the first service-tier filter may be used to adjust the QRAB such that an access terminal is more responsive or less responsive to received RABs, depending upon its service tier. For example, the service-tier filter may reduce the frequency with which the QRAB is determined to be 1, and thus reduce the frequency with which the access terminal reduces its reverse-link activity. Alternatively, the service-tier filter may increase the frequency with which the QRAB is determined to be 1, causing the access terminal to reduce its reverse-link activity more frequently. Other examples are also possible.

Figure 2B:
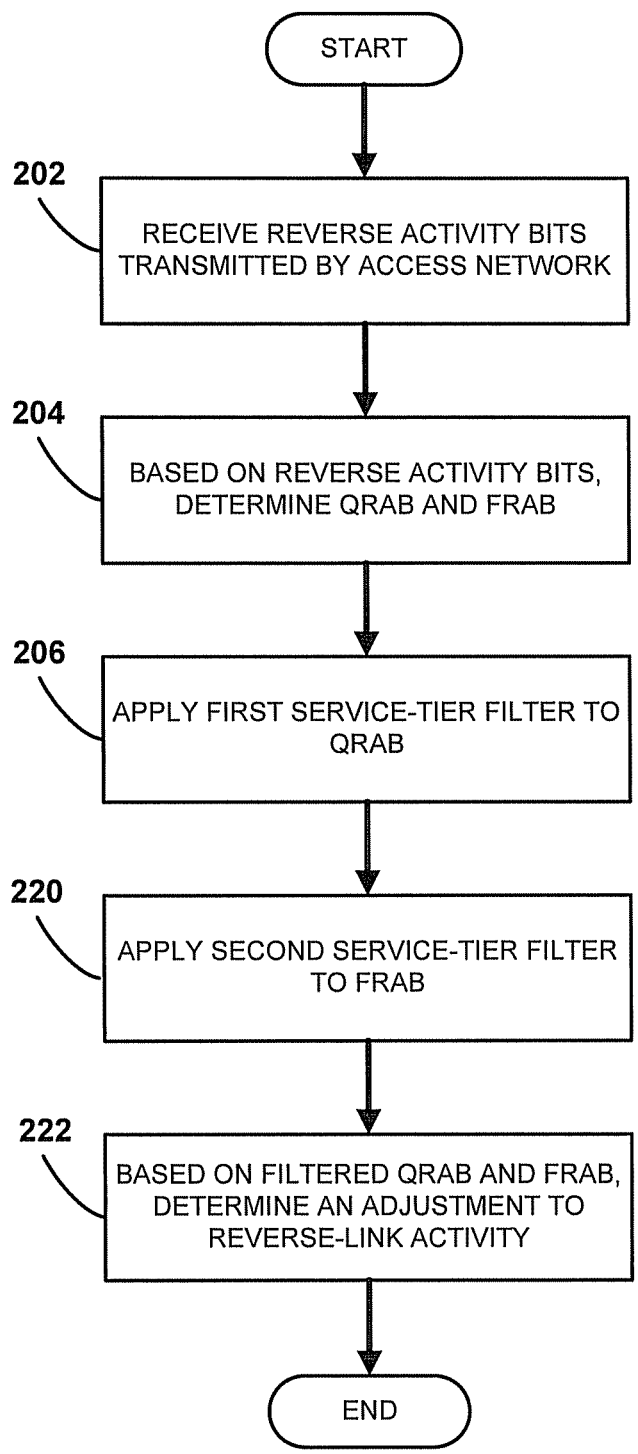
FIG. 2B is another flow chart illustrating a method that is carried out by an access terminal, according to an exemplary embodiment.

FIG. 2B is another flow chart illustrating a method that is carried out by an access terminal, according to an exemplary embodiment. In FIG. 2B, blocks 202-206 are carried out in the same manner as described in reference to FIG. 2A. However, in FIG. 2B, the access terminal applies a second service-tier filter to the FRAB, as shown by block 220. The second service-tier filter, like the first service-tier filter, corresponds to the service tier for which the access terminal is authorized. Then, based on the service-tier filtered QRAB and the service-tier filtered FRAB, the access terminal determines the adjustment to its reverse-link activity, as shown by block 222.

As with the first service-tier filter, the second service-tier filter may be used to adjust the FRAB such that an access terminal is more or less responsive to RABs. For example, the service-tier filter may tend to increase the value of FRAB to be closer to +1, and thus cause the access terminal to increase its reverse-link activity more frequently or reduce the frequency with which it decreases its reverse-link activity (or result in a reduction/increase of the amount by which the access terminal decreases/increases its reverse-link activity). On the other hand, the second service-tier filter may tend to decrease the value of the FRAB to be closer to −1, causing the access terminal to reduce its reverse-link activity more frequently and/or make larger reductions than it otherwise would. Other examples are also possible.

An access terminal may use exemplary methods, such as those described in reference to FIGS. 2A and 2B, to implement QoS-differentiated control of its reverse-link activity, and more generally, to receive QoS-differentiated service from an access network. In particular, a service provider may offer subscriptions that provide multiple levels of service, and accordingly, provide multiple corresponding service tiers, to its subscribers. Each service tier may specify, for example, particular services, applications, etc. that are available to a subscriber, the maximum bandwidth that is available to the subscriber for the various services, applications, etc., and/or the subscriber's priority for certain network resources. In an exemplary embodiment, where service tiers are used to provide QoS-differentiated service, the service tiers may take the form of QoS tiers. Access terminals may therefore be required to gain authorization for a given QoS tier before receiving service or accessing services and resources that are designated for the QoS tier.

Use of service tiers, and in particular QoS tiers, may help a service provider meet varying needs of its customers. For example, some users may wish to pay for a higher QoS tier with increased bandwidth and/or access to premium applications. Some may desire a QoS tier with guaranteed service. Others may not mind having reduced capabilities in times of high congestion (e.g., having a lower priority), as long as higher-quality service is provided when available. In any event, the implementation of an exemplary method in an access terminal may help a service provider meet the potentially diverse needs of its customers. It should be understood, however, that other benefits may also be provided by an exemplary embodiment.

As a specific example, a service provider may provide three QoS tiers, which, for simplicity, may be referred to as the Gold, Silver, and Bronze tiers. The Gold tier may provide the highest QoS, while the Bronze tier provides the lowest QoS and the Silver tier provides intermediary QoS. Accordingly, Gold-tier users may be authorized for more services, better access to services, access to more bandwidth, guaranteed bandwidth, etc., as compared to Silver-tier users and Bronze-tier users. Similarly, Silver-tier users may be authorized for superior services and/or access to network resources, as compared to Bronze-tier users. However, it is possible that in certain scenarios, lower-tier users (e.g., Bronze-tier users and/or Silver-tier user) may receive substantially the same service as higher-tier users (e.g., Gold-tier users and/or Silver-tier users). For instance, when network traffic is minimal and ample resources are available, users of all QoS tiers may be provided with the same bandwidth for data services. On the other hand, it is also possible that higher QoS tiers may always receive superior service as compared to lower QoS tiers.

Figure 3:
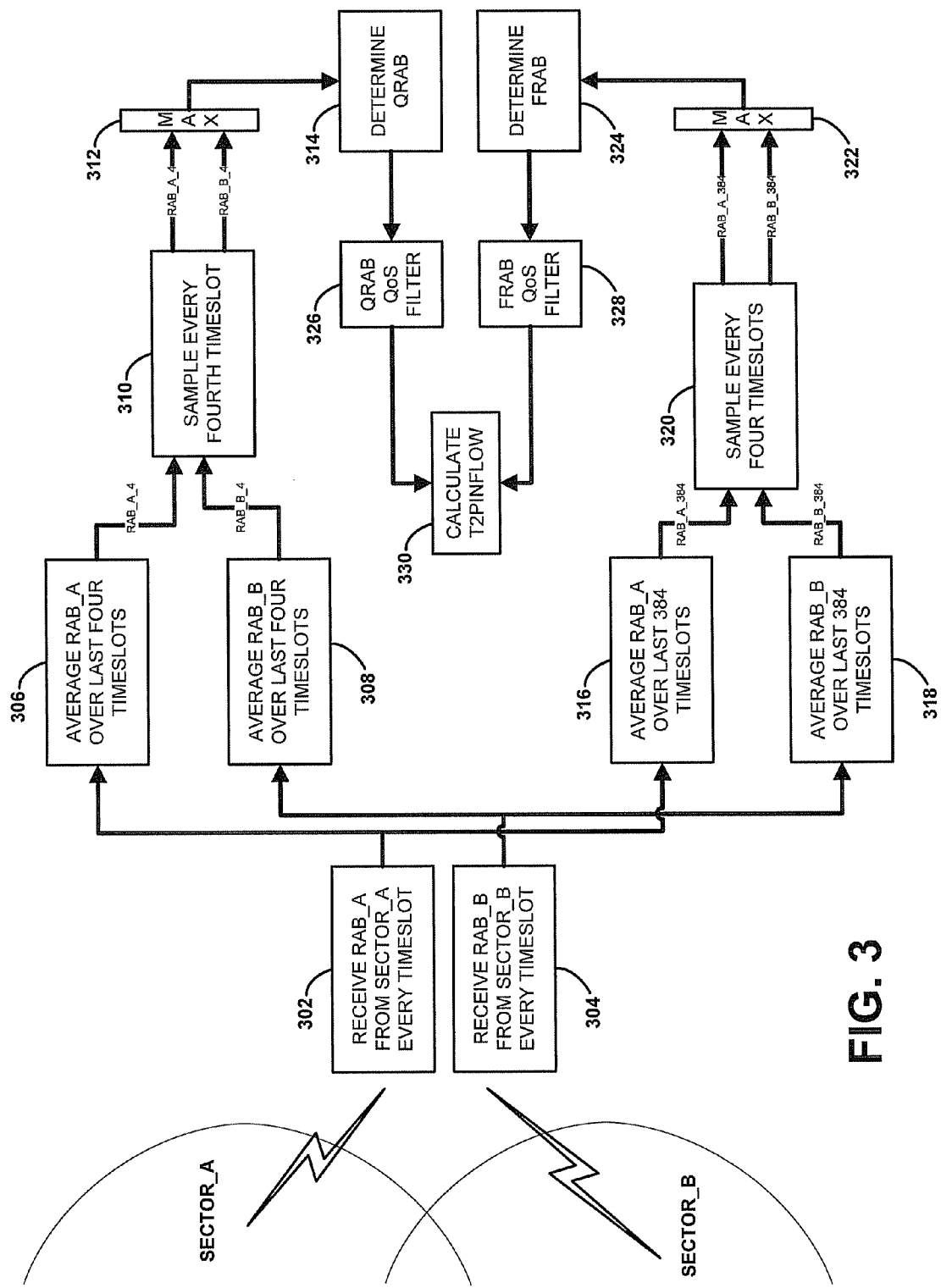
FIG. 3 is another flow chart illustrating a method that is carried out by an access terminal, according to an exemplary embodiment.

FIG. 3 is another flow chart illustrating an exemplary method that may be carried out by an access terminal. Generally, the method involves use of a QRAB filter and an FRAB filter to modify the QRAB and FRAB, depending upon the QoS tier for which the access terminal is authorized. As illustrated, the access terminal is connected in sector_A, and has an active set including sector_B. The RAB transmitted in sector_A is referred to as "RAB_A" and the RAB transmitted in sector_B is referred to as "RAB_B." Accordingly, the access terminal may receive RAB_A and RAB_B in every timeslot, as shown by blocks 302—304.

The access terminal uses the received RABs to determine QRAB and FRAB. Specifically, to determine QRAB, the access terminal maintains the average value of RAB_A over the last four timeslots (RAB_A_4), as shown by block 306, and the average value of RAB_B over the last four timeslots (RAB_B_4), as shown by block 308. Both the RAB_A_4 Average and the RAB_B_4 Average are then sampled every fourth timeslot, as shown by block 310. The access terminal then determines the maximum of these RAB averages (e.g., MAX(RAB_A_4, RAB_B_4)), as shown by block 312, and uses the maximum average RAB to determine QRAB, as shown by block 314.

To determine FRAB, the access terminal maintains the average value of RAB_A over the last 384 timeslots (RAB_A_384), as shown by block 316, and the average value of RAB_B over the last 384 timeslots (RAB_B_384), as shown by block 318. Both the RAB_A_384 Average and the RAB_B_384 Average are then sampled every fourth timeslot, as shown by block 320. The access terminal then determines the maximum of these RAB averages (e.g., MAX (RAB_A_384, RAB_B_384), as shown by block 322, and uses the maximum average RAB to determine FRAB, as shown by block 324.

After the access terminal determines a QRAB value, it adjusts the QRAB by applying a service-tier filter to the QRAB, which may be referred to as the QRAB filter, as shown by block 326. Similarly, once an FRAB value has been determined, the access terminal applies a service-tier filter to the FRAB, which may be referred to as the FRAB filter, as shown by block 328. In an exemplary embodiment, the QRAB and FRAB filters take the form of QoS filters, which filter the QRAB and the FRAB, respectively, according to the QoS tier for which the access terminal is authorized.

Since, in an exemplary embodiment, the functions of the QRAB and FRAB filters depend upon the QoS tier for which the access terminal is authorized, the same QRAB value and/or the same FRAB value may be filtered differently by access terminals authorized for different QoS tiers. It follows that an access terminal may adjust its reverse-link activity differently, depending upon its QoS tier. For instance, the QRAB filter may output 0 at certain times when the QRAB is calculated to be 1, or vice versa, and T2P adjustments may then be based on the filtered output, rather than the originally calculated QRAB value. Similarly, the FRAB filter may cause the degree to which an access terminal adjusts its reverse-link activity to vary according to QoS tier. Other effects of the QRAB and/or FRAB filters are also possible.

It is contemplated that the QRAB filter may employ various different techniques to filter the QRAB according to an access terminal's authorized service tier. As a simple example, the QRAB filter may be configured to maintain the results of at least a predetermined number of previous QRAB calculations (e.g., the QRAB value determined every $4^{th}$ timeslot). The QoS filter may then, for each service tier, set QRAB to 1 only when a certain number or certain percentage out of a predetermined number of QRAB values is equal to 1, and otherwise set QRAB to 0. Accordingly, the required number or percentage may be greater for higher QoS tiers, resulting in the filtered QRAB being set equal to 0 more frequently than for lower QoS tiers. For instance, in an embodiment where Gold, Silver, and Bronze tier service are provided, the QRAB filter may output a 1 only when more than a threshold number (Gold_QRAB_Threshold) out of the last three QRAB values (QRAB(t) through QRAB(t−2)) have been equal to 1. If less than the threshold number have been equal to 1, then the QRAB filter outputs 0, regardless of the current QRAB value (i.e., QRAB(t)). Thus, for Gold-tier users, this particular QRAB filter outputs a 1 only if:

$$QRAB(t)+QRAB(t-1)+QRAB(t-2)>\text{Gold\_QRAB\_Threshold}$$

As another example, for Silver-tier users, the QRAB filter may require that fifty percent or two out of every four QRAB determinations be equal to 1. Many other examples are also possible.

As one additional example, the QRAB filter may require a threshold number of consecutive QRAB values to be equal to 1, in order to output a 1. Further, a different threshold may be defined for each QoS tier. To illustrate, the Gold-tier threshold may be three, the Silver-tier threshold may be two, and the Bronze-tier threshold may be one (or alternatively, may be undefined). Thus, for Gold-tier users, the QRAB filter outputs a 1 only when QRAB is determined to be 1 in three consecutive instances. For Silver-tier users, the QRAB filter outputs a 1 only when QRAB is calculated to be 1 in two consecutive instances. For a Bronze-tier user, since the threshold is one, the QRAB filter may simply let the determined QRAB pass through unfiltered for T2P calculations.

It is contemplated that the FRAB filter may also employ various different techniques to filter the FRAB, according to an access terminal's authorized service tier. As one example, the FRAB filter may apply different adjustment factors to the calculated FRAB, depending upon the QoS tier for which the user of an access terminal is authorized. In an exemplary embodiment, the adjustment factors may take the form of dampening factors of varying degree. For instance, a large dampening factor may be applied to the FRAB for Gold-tier users, a somewhat smaller dampening factor may be applied to the FRAB for Silver-tier users, and an even smaller dampening factor may be applied to the FRAB for Silver-tier users. Alternatively, FRAB may be allowed to pass unfiltered for Bronze-tier users.

Furthermore, the FRAB filter may be dependent upon the direction indicated by QRAB. For example, in a scenario where QRAB indicates that an access terminal should increase its reverse-link activity, FRAB may be unfiltered, or even amplified, for Gold and/or Silver tier users, and possibly dampened at the same time for Bronze. Similarly, in a scenario where QRAB indicates that an access terminal should decrease its reverse-link activity, FRAB may be decreased or dampened for Gold and/or Silver tier users. Other examples are also possible.

It should be understood that regardless of the specific embodiments described herein, exemplary embodiments may involve only a QRAB filter, only an FRAB filter, or may include both a QRAB and an FRAB filter, without departing from the scope of the invention. Further, while the QRAB and FRAB filters are described as being applied after the QRAB and FRAB have been determined, these filters may alternatively be considered part of the process of determining the QRAB and the FRAB.

Figure 4:
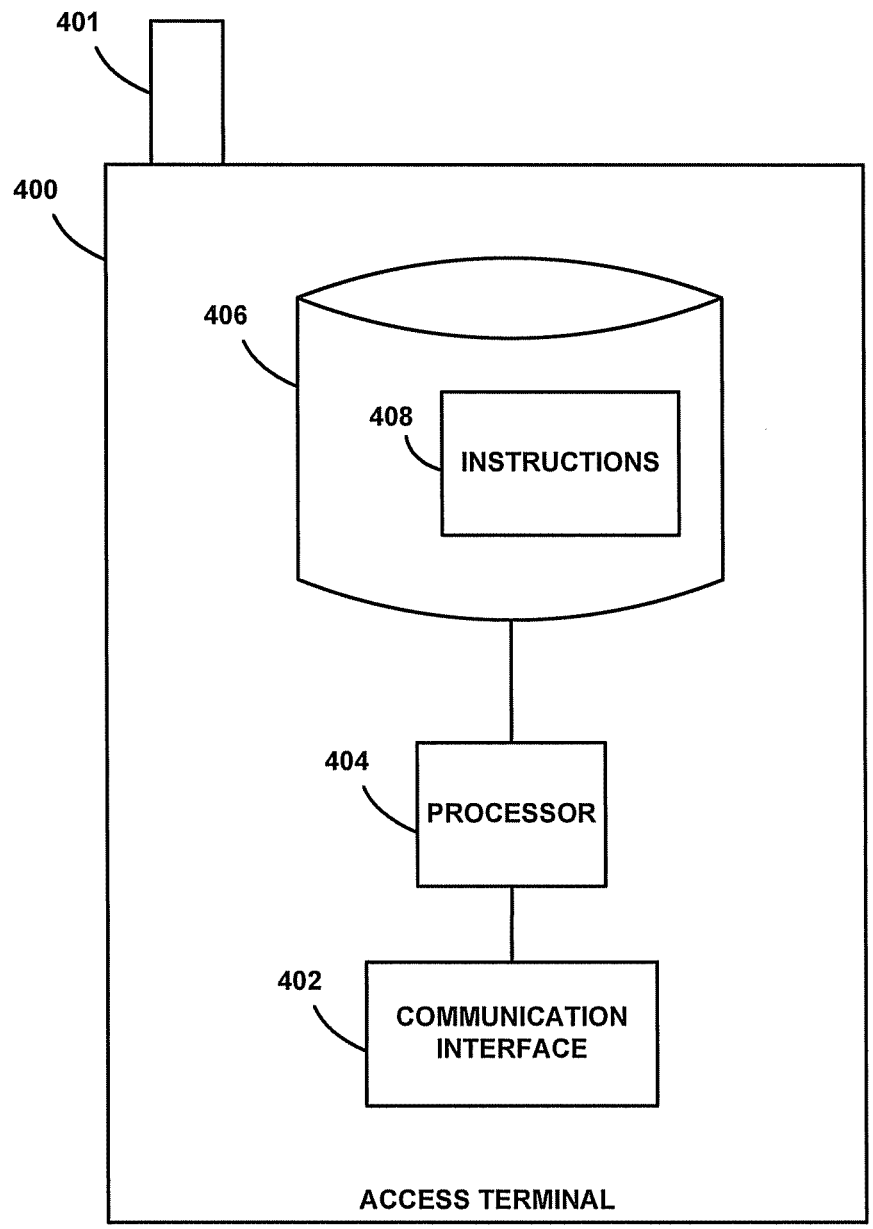
FIG. 4 is a block diagram illustrating an access terminal according to an exemplary embodiment.

FIG. 4 is a block diagram illustrating an access terminal 400 according to an exemplary embodiment. The access terminal 400 includes an antenna 401, a communication interface 402, a processor 404, and data storage 406. Data storage 406 stores program code or instructions 408 that are executable by processor 404 to engage in communications with an access network, such as that illustrated in FIG. 1. Further, instructions 408 may be executable to apply service tier filters to the QRAB and/or the FRAB, and in particular to filter the QRAB and/or FRAB in order to adjust reverse-link activity based upon the particular service tier for which the access terminal 400 is authorized.

The instructions 408 may be executable to (i) receive one or more reverse activity bits from a wireless access network, (ii) based at least in part on the received reverse activity bits, determine a Quick Reverse Activity Bit (QRAB) and a Filtered Reverse Activity Bit (FRAB), (iii) apply a service-tier filter to at least one of (a) the determined QRAB and (b) the determined FRAB, wherein the service-tier filter corresponds to a service tier for which the access terminal is authorized; and (iv) based at least in part on output of the service-tier filter, determine an adjustment to reverse-link activity of the access terminal.

Accordingly, access terminal 400 may be further configured to request and receive authorization for service according to one of multiple available service tiers (e.g., QoS tiers). As such, the access terminal may also be configured to prompt the user for authorization information, such as a user name and password, and send the authorization information entered by the user to the access network. In an alternative embodiment, the access network may be configured to authorize the access terminal 400 automatically, and thus the access terminal may be configured to automatically receive (e.g., without specifically requesting) authorization for a particular service tier. Generally, an access terminal and/or access network may employ any technique for authorizing a user or an access terminal for certain services, without departing from the scope of the invention.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method carried out at an access terminal comprising:
   receiving one or more reverse activity bits from a wireless access network;
   based at least in part on the received reverse activity bits, determining a Quick Reverse Activity Bit (QRAB);
   selecting a first service-tier filter from a plurality of possible service-tier filters, wherein the first service-tier filter corresponds to a pre-defined service tier for which the access terminal is authorized, wherein each service-tier filter indicates a different number of QRAB determinations that should be used to determine a service-tier filtered QRAB;
   applying the first service-tier filter to the determined QRAB to determine a first service-tier filtered QRAB; and
   based at least in part on the first service-tier filtered QRAB, determining an adjustment to reverse-link activity of the access terminal.

2. The method of claim 1, further comprising periodically determining the QRAB, wherein applying a first service-tier filter to the determined QRAB comprises:
   outputting a value of 1 only if the QRAB has been consecutively determined to be 1 for at least the predetermined number of QRAB determinations that is indicated by the first service-tier filter; and
   otherwise outputting a value of 0.

3. The method of claim 1, further comprising periodically determining the QRAB, wherein applying a first service-tier filter to the determined QRAB comprises:
outputting a value of 1 only if the QRAB has been determined to be 1 in a predetermined percentage of the predetermined number of QRAB determinations that is indicated by the first service-tier filter; and
otherwise outputting a value of 0.

4. The method of claim 1, wherein the wireless access network provides wireless service at a plurality of service tiers.

5. The method of claim 4, wherein the plurality of service tiers comprises at least three service tiers comprising a first, second, and third service tier, wherein the three service tiers are prioritized such that the first service tier is high-priority, the second service tier is intermediary-priority, and the third service tier is low-priority.

6. The method of claim 4, wherein the plurality of service tiers comprises a plurality of quality-of-service (QoS) tiers.

7. The method of claim 6, wherein at least one of (a) available bandwidth and (b) available functionality varies between each QoS tier.

8. The method of claim 1, further comprising initially requesting authorization from the wireless access network for the service tier for which the access terminal is authorized.

9. The method of claim 1, further comprising initially receiving authorization from the wireless access network for the service tier for which the access terminal is authorized.

10. The method of claim 9, further comprising based at least in part on the service-tier filtered FRAB, determining the adjustment to the reverse-link activity of the access terminal.

11. The method of claim 1, further comprising requesting and receiving authorization from the wireless access network for the service tier for which the access terminal is authorized.

12. The method of claim 1, further comprising:
based at least in part on the received reverse activity bits, determining a Filtered Reverse Activity Bit (FRAB);
selecting a second service-tier filter that is different from the first service-tier filter, wherein the second service-tier filter corresponds to the pre-defined service tier for which the access terminal is authorized; and
applying the second service-tier filter to the determined FRAB to determine a service-tier filtered FRAB.

13. An access terminal comprising:
a communication interface;
a processor; and
data storage comprising instructions executable by the processor to:
receive one or more reverse activity bits from a wireless access network;
based at least in part on the received reverse activity bits, determine a Quick Reverse Activity Bit (QRAB) and a Filtered Reverse Activity Bit (FRAB);
select a first service-tier filter from a plurality of possible service-tier filters, wherein the first service-tier filter corresponds to a pre-defined service tier for which the access terminal is authorized, wherein each service-tier filter indicates a different number of QRAB determinations that should be used to determine a service-tier filtered QRAB;
apply the service-tier filter to at least one of (a) the determined QRAB and (b) the determined FRAB; and
based at least in part on output of the service-tier filter, determine an adjustment to reverse-link activity of the access terminal.

14. The access terminal of claim 13, wherein the access terminal is configured to apply the service-tier filter to the determined QRAB only.

15. The access terminal of claim 13, wherein the access terminal is configured to apply the service-tier filter to the determined FRAB only.

16. The access terminal of claim 13, wherein the access terminal is configured to apply the service-tier filter to the determined QRAB and the determined FRAB.

17. The access terminal of claim 13, wherein the wireless access network provides service at a plurality of service tiers, and wherein the access terminal is further configured to request authorization from the wireless access network to receive wireless service at a particular one of the service tiers.

18. A method carried out at an access terminal comprising:
receiving one or more reverse activity bits from a wireless access network;
based at least in part on the received reverse activity bits, determining a Quick Reverse Activity Bit (QRAB) and a Filtered Reverse Activity Bit (FRAB);
selecting a first service-tier filter from a plurality of possible service-tier filters, wherein the first service-tier filter corresponds to a pre-defined service tier for which the access terminal is authorized;
applying the first service-tier filter to the determined QRAB to determine a first service-tier filtered QRAB;
selecting a second service-tier filter that is different from the first service-tier filter, wherein the second service-tier filter corresponds to the pre-defined service tier for which the access terminal is authorized; and
applying the second service-tier filter to the determined FRAB to determine a second service-tier filtered FRAB; and
based at least in part on the first service-tier filtered QRAB and the second service-tier filtered FRAB, determining an adjustment to reverse-link activity of the access terminal.

* * * * *